United States Patent
Abe

(10) Patent No.: US 9,651,762 B2
(45) Date of Patent: May 16, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Hirofumi Abe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 14/944,555

(22) Filed: Nov. 18, 2015

(65) Prior Publication Data

US 2016/0147049 A1   May 26, 2016

(30) Foreign Application Priority Data

Nov. 25, 2014   (JP) .................................. 2014-237549

(51) Int. Cl.
  *G02B 15/17* (2006.01)
  *G02B 15/173* (2006.01)
  *G02B 27/64* (2006.01)

(52) U.S. Cl.
  CPC ......... *G02B 15/173* (2013.01); *G02B 27/646* (2013.01)

(58) Field of Classification Search
  CPC .......................................... G02B 15/00–15/28
  See application file for complete search history.

(56) References Cited

U.S. PATENT DOCUMENTS

| | | | | |
|---|---|---|---|---|
| 2007/0201145 A1* | 8/2007 | Ohtake | ................ | G02B 15/173 359/687 |
| 2008/0304161 A1* | 12/2008 | Souma | ..................... | G02B 9/60 359/683 |
| 2009/0207499 A1* | 8/2009 | Katakura | ............. | G02B 15/173 359/683 |
| 2011/0007396 A1* | 1/2011 | Suzaki | ................. | G02B 15/173 359/557 |
| 2011/0286114 A1* | 11/2011 | Nagaoka | ................ | G02B 7/021 359/733 |
| 2011/0286115 A1* | 11/2011 | Nagaoka | ................ | G02B 7/021 359/733 |
| 2012/0075494 A1* | 3/2012 | Katayose | ............. | G02B 15/173 348/222.1 |

(Continued)

FOREIGN PATENT DOCUMENTS

JP   2007-212926 A   8/2007
JP   2007-328306 A   12/2007

*Primary Examiner* — Bumsuk Won
*Assistant Examiner* — Jeffrey Madonna
(74) *Attorney, Agent, or Firm* — Carter, DeLuca, Farrell & Schmidt, LLP

(57) ABSTRACT

A zoom lens includes, in order from an object side: first to fifth lens units respectively having positive, negative, positive, positive, and positive or negative refractive powers. The first lens unit is configured not to move for zooming, and the second, third, and fourth lens units are configured to move during zooming to change an interval between adjacent lens units. An aperture stop is arranged between the second and third lens units. The second lens unit is positioned on the image side and the third lens unit is positioned on the object side at a telephoto end. Focal lengths of the zoom lens at a wide angle end and of the third and fourth lens units, lateral magnifications of a lens group consisting of the third and fourth lens units at the wide angle end and at the telephoto end are each appropriately set.

10 Claims, 11 Drawing Sheets

(56) References Cited

U.S. PATENT DOCUMENTS

| | | | | |
|---|---|---|---|---|
| 2012/0293872 | A1* | 11/2012 | Katayose | G02B 15/173 359/684 |
| 2013/0135751 | A1* | 5/2013 | Atsuumi | G02B 15/14 359/683 |
| 2014/0268365 | A1* | 9/2014 | Nishio | G02B 7/04 359/683 |
| 2015/0370051 | A1* | 12/2015 | Morooka | H04N 5/23296 348/240.3 |

* cited by examiner

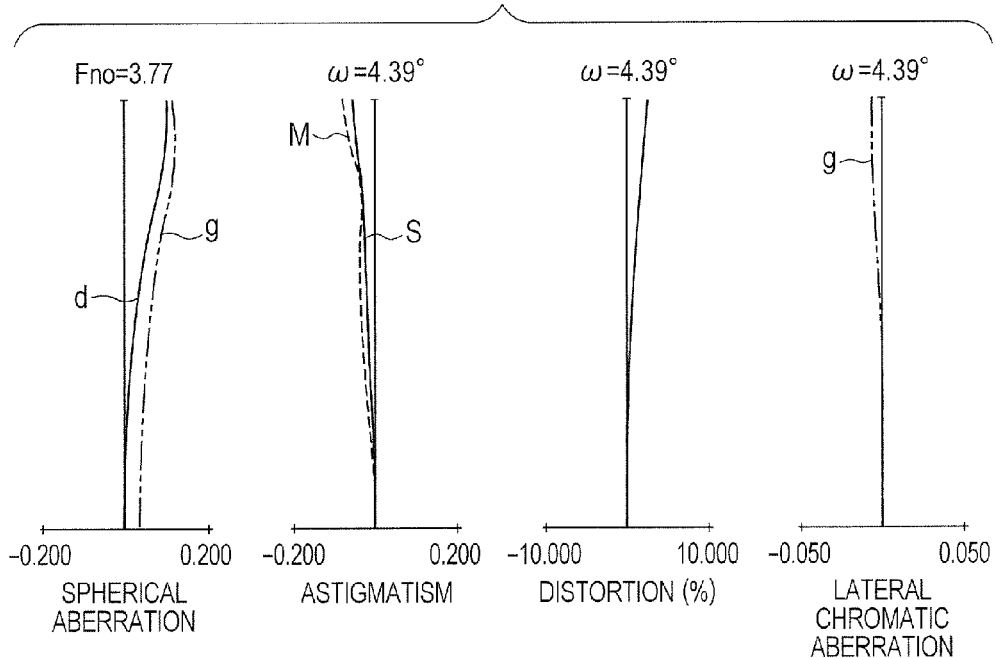
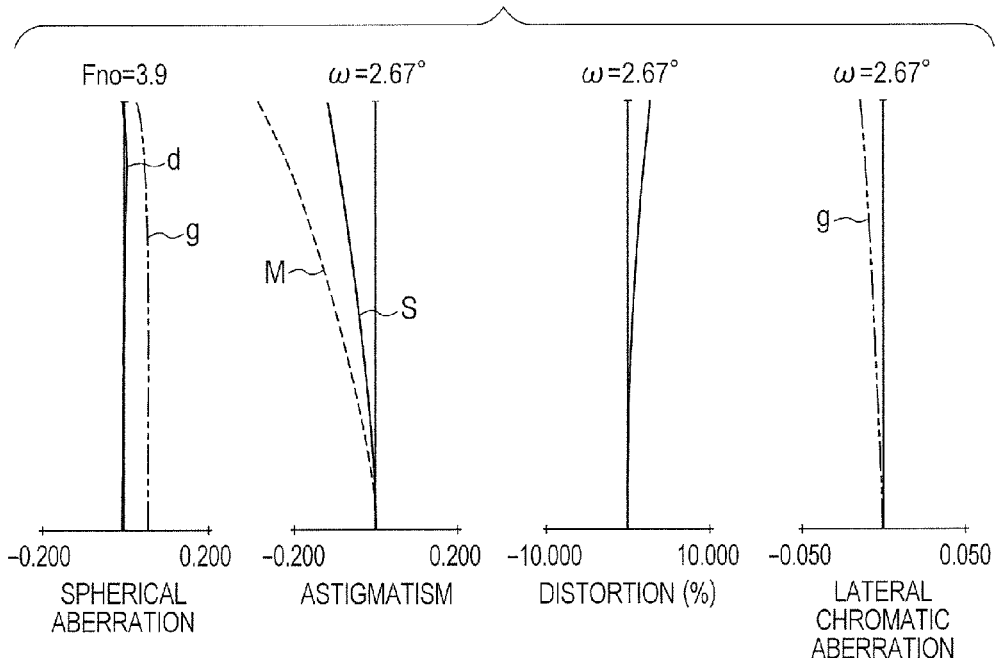

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup apparatus using a solid-state image pickup element, such as a video camera, an electronic still camera, a broadcasting camera, or a monitoring camera, or an image pickup apparatus such as a silver-halide film camera.

Description of the Related Art

In recent years, an image pickup optical system for use in an image pickup apparatus using a solid-state image pickup element is required to have a short total lens length, a wide angle of view, a high zoom ratio, and a high optical characteristic over the entire zoom range. As a zoom lens that satisfies those requirements, a positive-lead type zoom lens in which a lens unit having a positive refractive power is arranged closest to an object side has been known. As the positive-lead type zoom lens, a zoom lens including five lens units as a whole has been known.

In Japanese Patent Application Laid-Open No. 2007-212926, there is disclosed a zoom lens including, in order from an object side to an image side, a first lens unit to a fifth lens unit having positive, negative, positive, positive, and positive refractive powers, in which the first lens unit to the fourth lens unit are configured to move for zooming. In the zoom lens, the fourth lens unit is configured to move for focusing. In Japanese Patent Application Laid-Open No. 2007-328306, there is disclosed a zoom lens including, in order from an object side to an image side, a first lens unit to a fifth lens unit having positive, negative, positive, positive, and positive or negative refractive powers, in which the second lens unit and the fourth lens unit are configured to move for zooming. In the zoom lens, the fourth lens unit is configured to move for focusing.

In Japanese Patent Application Laid-Open No. 2007-212926 and Japanese Patent Application Laid-Open No. 2007-328306, there is disclosed a five-unit zoom lens of a so-called rear focus type in which the second lens unit is moved to mainly vary magnification, and in which the fourth lens unit corrects an image plane variation accompanying the magnification varying and performs focusing. In general, the zoom lens of the rear focus type has a smaller effective diameter of the first lens unit than that of a zoom lens in which the first lens unit is moved to perform focusing, and is easy to reduce the size of the entire lens system. Moreover, close-up photography is easy. Further, a lens unit having small size and weight is moved, which leads to a requirement of small driving power for the lens unit, ability of rapid focusing, and other such features.

With a change in resolution of the image pickup apparatus from Full HD to 4K, the zoom lens used with the image pickup apparatus is required to be a zoom lens that is compatible with a larger image pickup element and has a high optical characteristic.

In general, in a zoom lens, in order to downsize an entire system of the zoom lens while securing a predetermined zoom ratio, the number of lenses may be reduced while strengthening refractive powers of the lens units forming the zoom lens. However, the zoom lens having such configuration generates a larger amount of various aberrations, and it is difficult to satisfactorily correct the various aberrations. In the positive-lead type five-unit zoom lens described above, in order to obtain the high optical characteristic over the entire zoom range while securing the reduced size of the entire system and a high zoom ratio, it is important to appropriately set respective elements of the zoom lens.

For example, it is important to appropriately set the refractive powers of the lens units, movement loci of the second lens unit and the third lens unit accompanying the zooming, imaging magnifications of the third lens unit and the fourth lens unit, lens configurations of the lens units, and the like. When those configurations are not appropriate, the entire system is increased in size in realizing the high zoom ratio, and variations in various aberrations accompanying the zooming are increased. Accordingly, it is very difficult to obtain the high optical characteristic over the entire zoom range and the entire image plane.

SUMMARY OF THE INVENTION

A zoom lens according to one embodiment of the present invention includes, in order from an object side to an image side:

a first lens unit having a positive refractive power;
a second lens unit having a negative refractive power;
an aperture stop;
a third lens unit having a positive refractive power;
a fourth lens unit having a positive refractive power; and
a fifth lens unit having one of a positive refractive power and a negative refractive power, in which the first lens unit is configured not to move for zooming, and the second lens unit, the third lens unit, and the fourth lens unit are configured to move during zooming to change intervals between adjacent lens units, in which the second lens unit is positioned closer to the image side and the third lens unit is positioned closer to the object side at a telephoto end than at a wide angle end, and in which the following conditional expressions are satisfied:

$$4.7 < f3/fw < 8.0;$$

$$1.2 < f3/f4 < 2.7;$$

and $$1.2 < \beta 34t/\beta 34w < 3.0,$$

where fw represents a focal length of an entire system of the zoom lens at the wide angle end, f3 represents a focal length of the third lens unit, f4 represents a focal length of the fourth lens unit, β34w represents a lateral magnification of a lens group consisting of the third lens unit and the fourth lens unit at the wide angle end, and β34t represents a lateral magnification of the lens group consisting of the third lens unit and the fourth lens unit at the telephoto end.

Further features of the present invention will become apparent from the following description of exemplary embodiments with reference to the attached drawings.

BRIEF DESCRIPTION OF THE DRAWINGS

FIG. 2B is a diagram for showing aberrations at an intermediate zoom position according to Embodiment 1.

FIG. 2C is a diagram for showing aberrations at a telephoto end according to Embodiment 1.

DESCRIPTION OF THE EMBODIMENTS

A zoom lens and an image pickup apparatus including the same according to the present invention are hereinafter described with reference to the drawings. A zoom lens according to the present invention includes, in order from an object side to an image side: a first lens unit having a positive refractive power; a second lens unit having a negative refractive power; a third lens unit having a positive refractive power; a fourth lens unit having a positive refractive power; and a fifth lens unit having one of a positive refractive power and a negative refractive power. The first lens unit is configured not to move for zooming, and the second lens unit, the third lens unit, and the fourth lens unit are configured to move during zooming to change an interval between adjacent lens units. The second lens unit is positioned closer to the image side, and the third lens unit is positioned closer to the object side at a telephoto end than at a wide angle end. An aperture stop is arranged between the second lens unit and the third lens unit.

Figure 1:
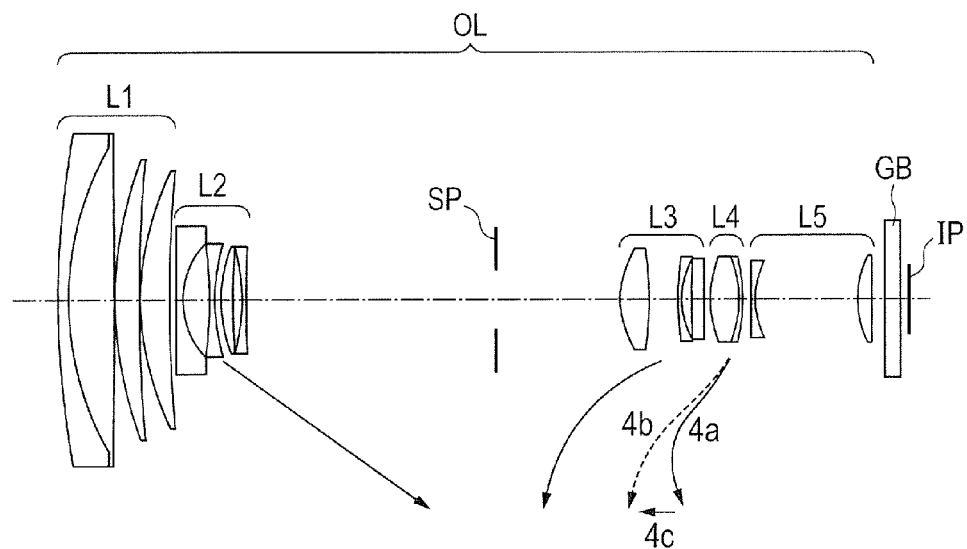
FIG. 1 is a lens cross-sectional view according to Embodiment 1 of the present invention.
Figure 2A:
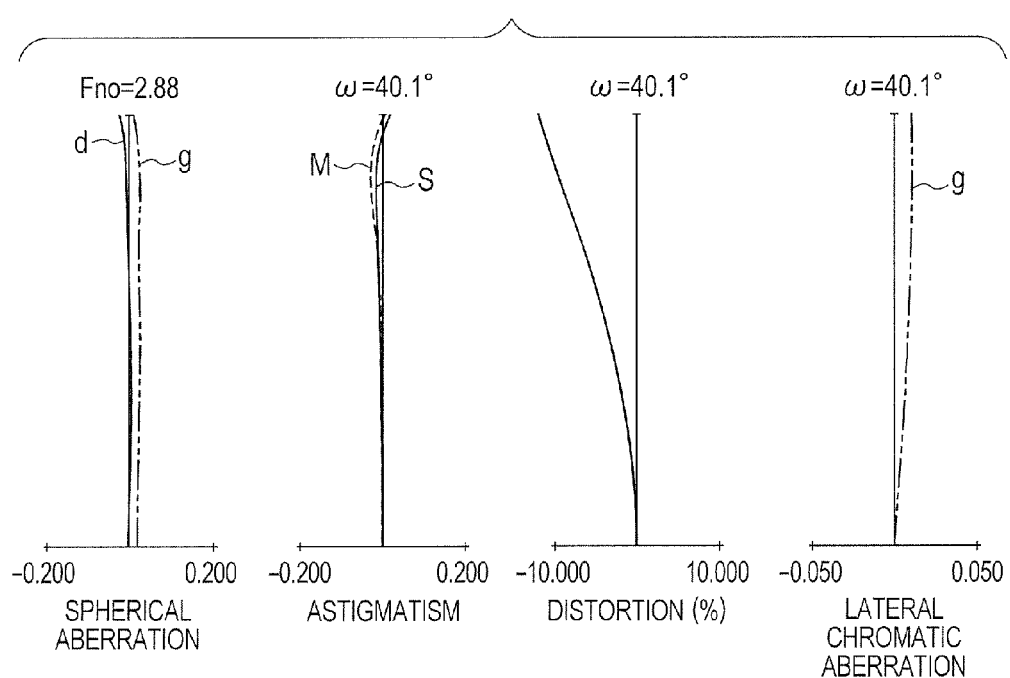
FIG. 2A is a diagram for showing aberrations at a wide angle end according to Embodiment 1.

FIG. 1 is a lens cross-sectional view of a zoom lens at a wide angle end according to Embodiment 1 of the present invention. FIGS. 2A, 2B, and 2C are respectively aberration diagrams at the wide angle end, an intermediate zoom position, and a telephoto end of the zoom lens of Embodiment 1 of the present invention. The zoom lens of Embodiment 1 has a zoom ratio of 17.50 and an f-number of from 2.88 to 3.90.

Figure 3:
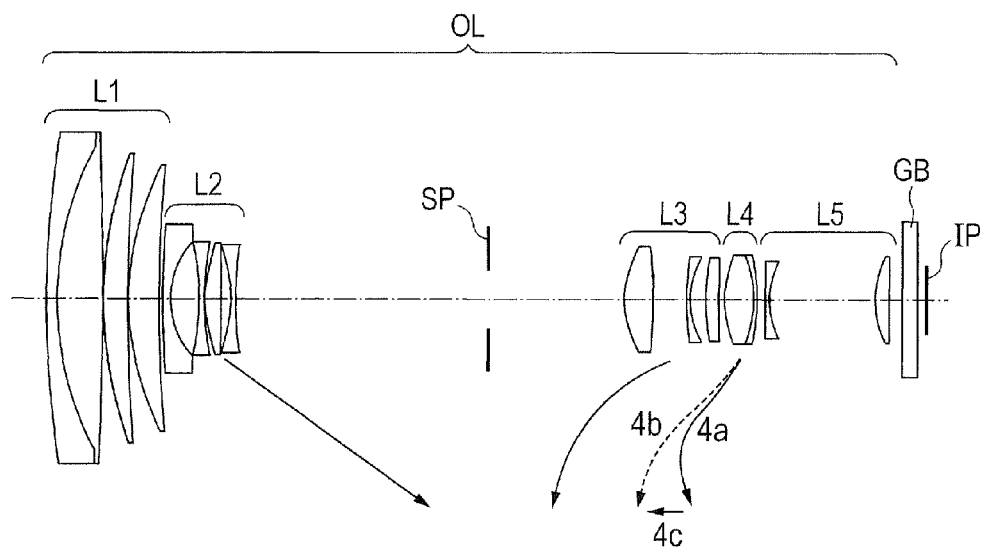
FIG. 3 is a lens cross-sectional view according to Embodiment 2 of the present invention.
Figure 4A:
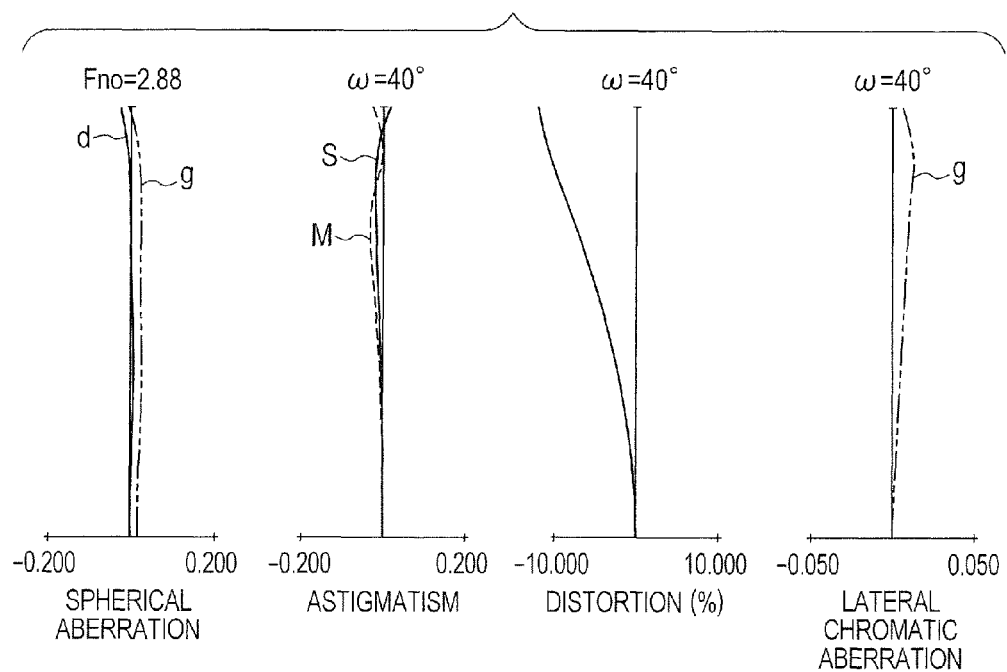
FIG. 4A is a diagram for showing aberrations at a wide angle end according to Embodiment 2.
Figure 4B:
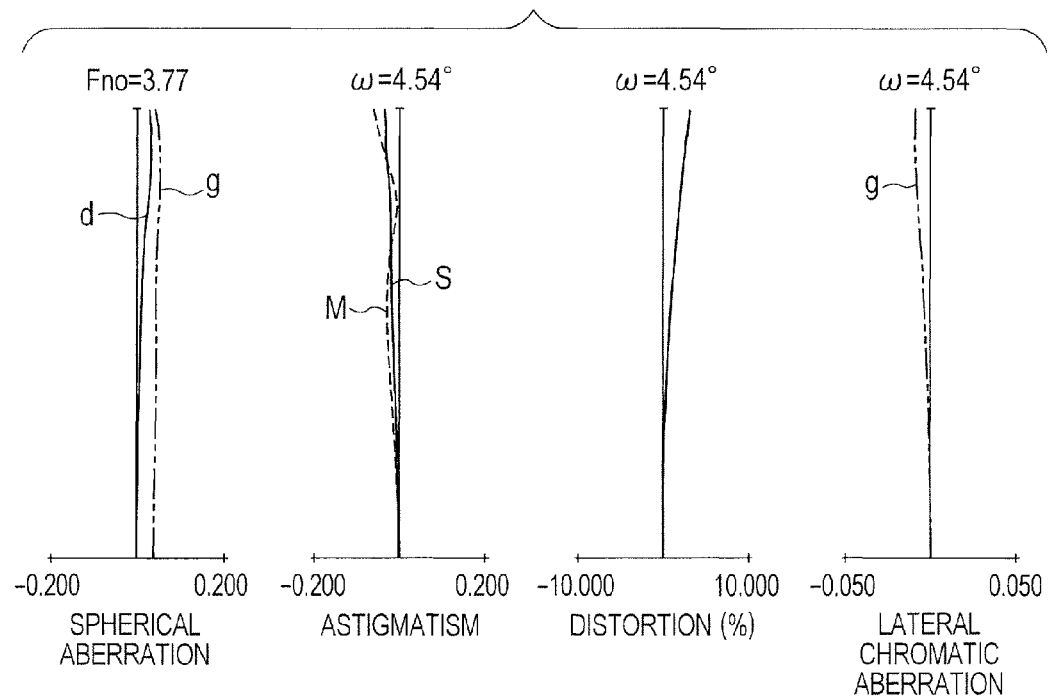
FIG. 4B is a diagram for showing aberrations at an intermediate zoom position according to Embodiment 2.
Figure 4C:
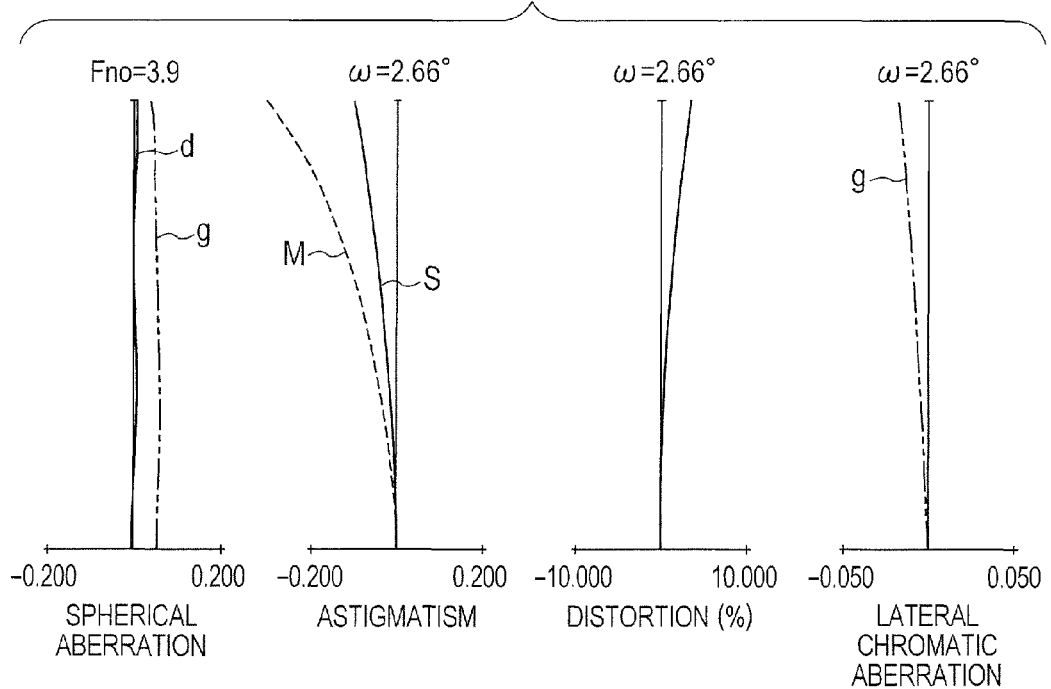
FIG. 4C is a diagram for showing aberrations at a telephoto end according to Embodiment 2.

FIG. 3 is a lens cross-sectional view of a zoom lens at a wide angle end according to Embodiment 2 of the present invention. FIGS. 4A, 4B, and 4C are respectively aberration diagrams at the wide angle end, an intermediate zoom position, and a telephoto end of the zoom lens of Embodiment 2 of the present invention. The zoom lens of Embodiment 2 has a zoom ratio of 17.50 and an f-number of from 2.88 to 3.90.

Figure 5:
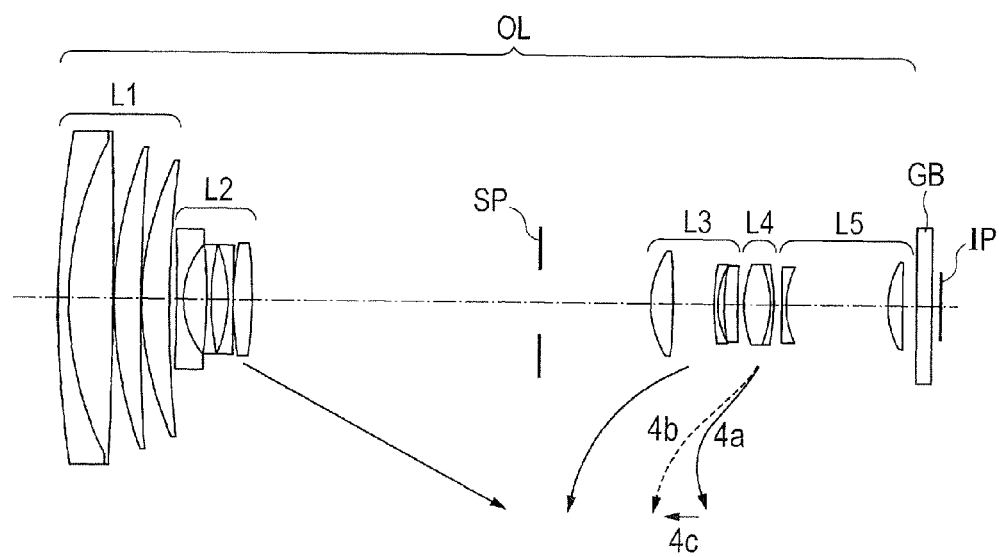
FIG. 5 is a lens cross-sectional view according to Embodiment 3 of the present invention.
Figure 6A:
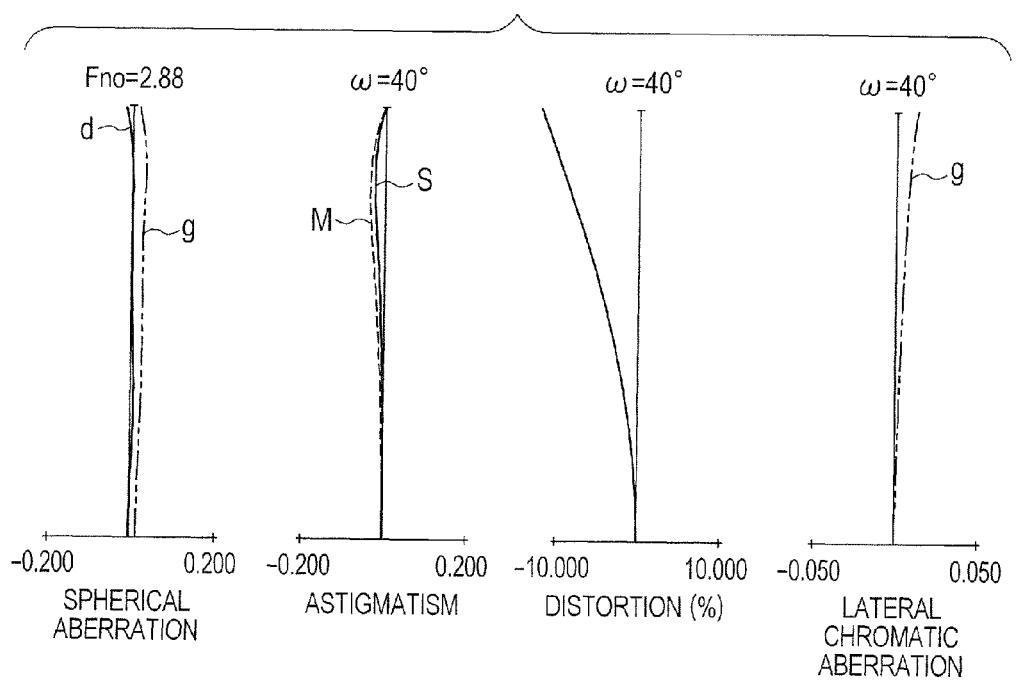
FIG. 6A is a diagram for showing aberrations at a wide angle end according to Embodiment 3.
Figure 6B:
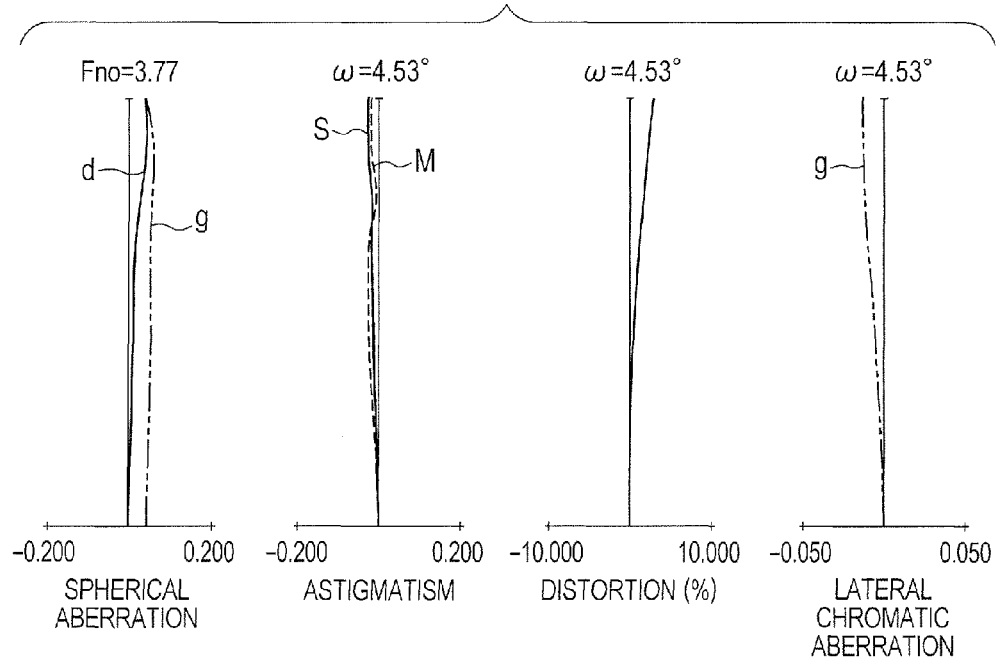
FIG. 6B is a diagram for showing aberrations at an intermediate zoom position according to Embodiment 3.
Figure 6C:
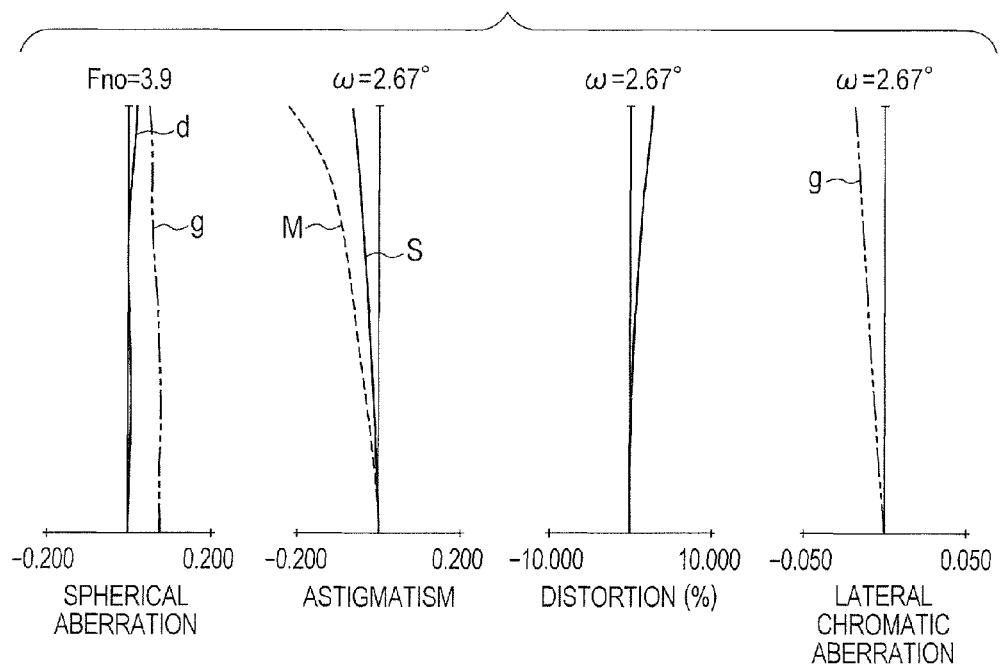
FIG. 6C is a diagram for showing aberrations at a telephoto end according to Embodiment 3.

FIG. 5 is a lens cross-sectional view of a zoom lens at a wide angle end according to Embodiment 3 of the present invention. FIGS. 6A, 6B, and 6C are respectively aberration diagrams at the wide angle end, an intermediate zoom position, and a telephoto end of the zoom lens of Embodiment 3 of the present invention. The zoom lens of Embodiment 3 has a zoom ratio of 17.50 and an f-number of from 2.88 to 3.90.

Figure 7:
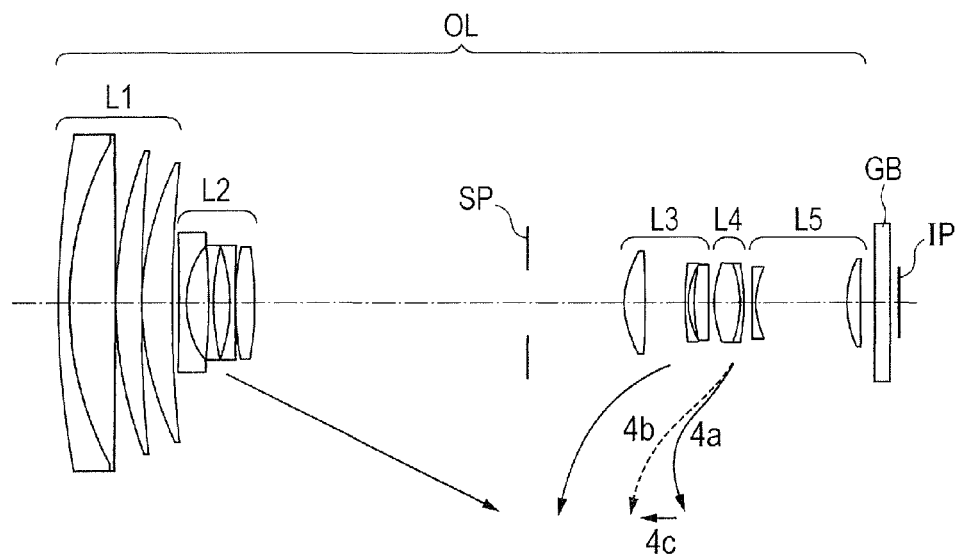
FIG. 7 is a lens cross-sectional view according to Embodiment 4 of the present invention.
Figure 8A:
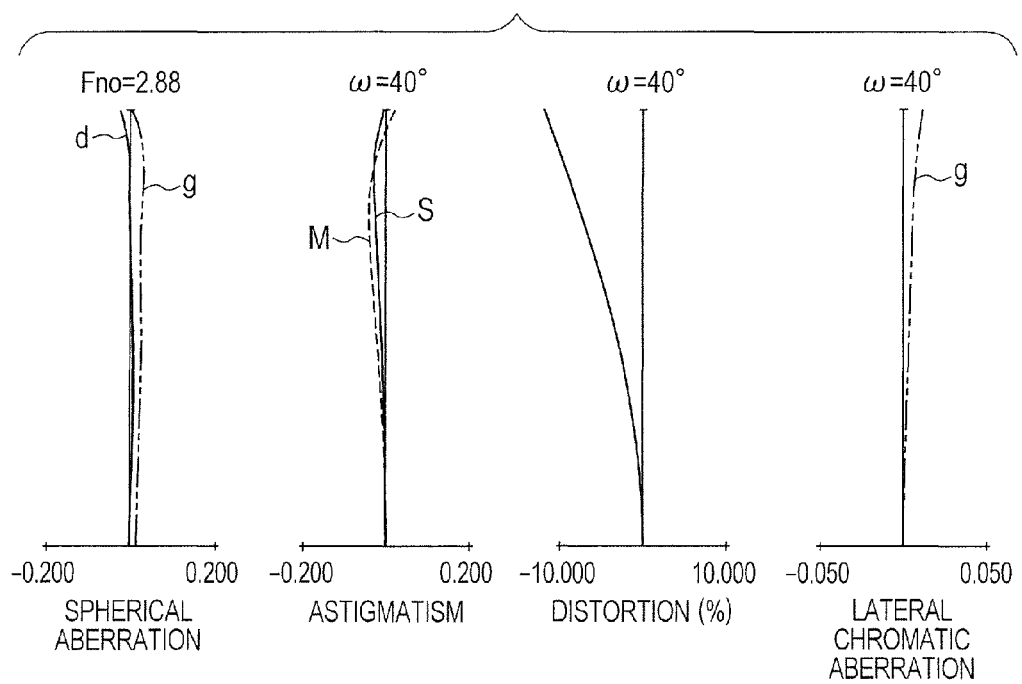
FIG. 8A is a diagram for showing aberrations at a wide angle end according to Embodiment 4.
Figure 8B:
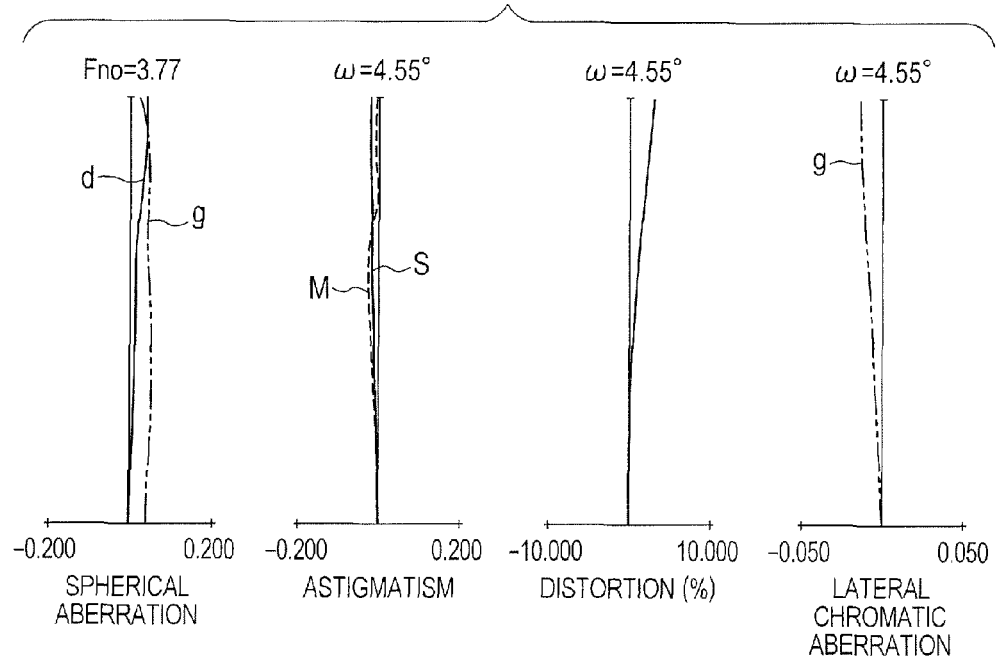
FIG. 8B is a diagram for showing aberrations at an intermediate zoom position according to Embodiment 4.
Figure 8C:
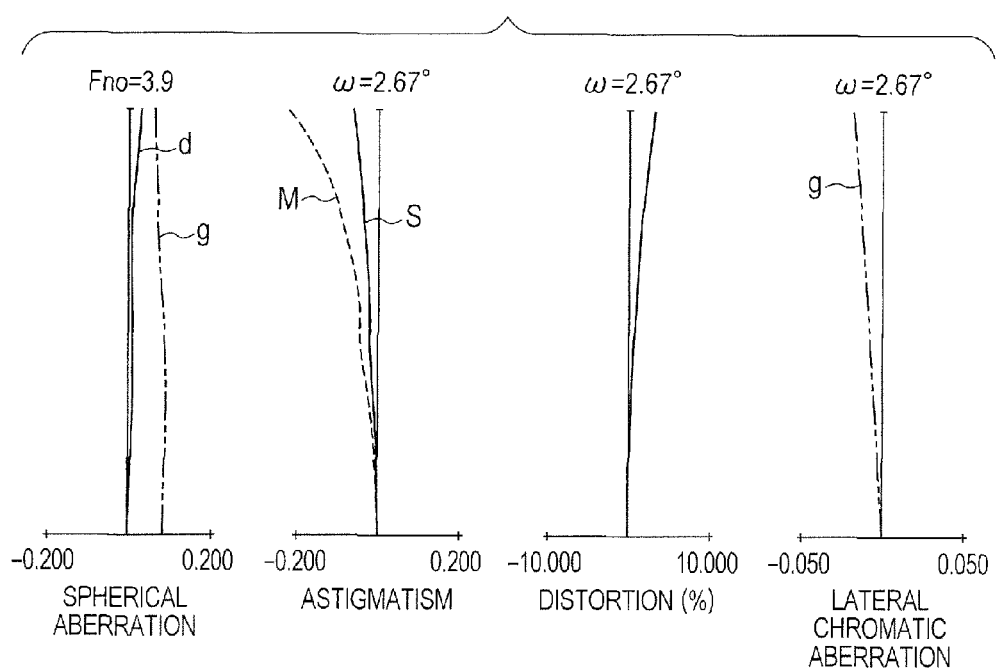
FIG. 8C is a diagram for showing aberrations at a telephoto end according to Embodiment 4.

FIG. 7 is a lens cross-sectional view of a zoom lens at a wide angle end according to Embodiment 4 of the present invention. FIGS. 8A, 8B, and 8C are respectively aberration diagrams at the wide angle end, an intermediate zoom position, and a telephoto end of the zoom lens of Embodiment 4 of the present invention. The zoom lens of Embodiment 4 has a zoom ratio of 17.50 and an f-number of from 2.88 to 3.90.

Figure 9:
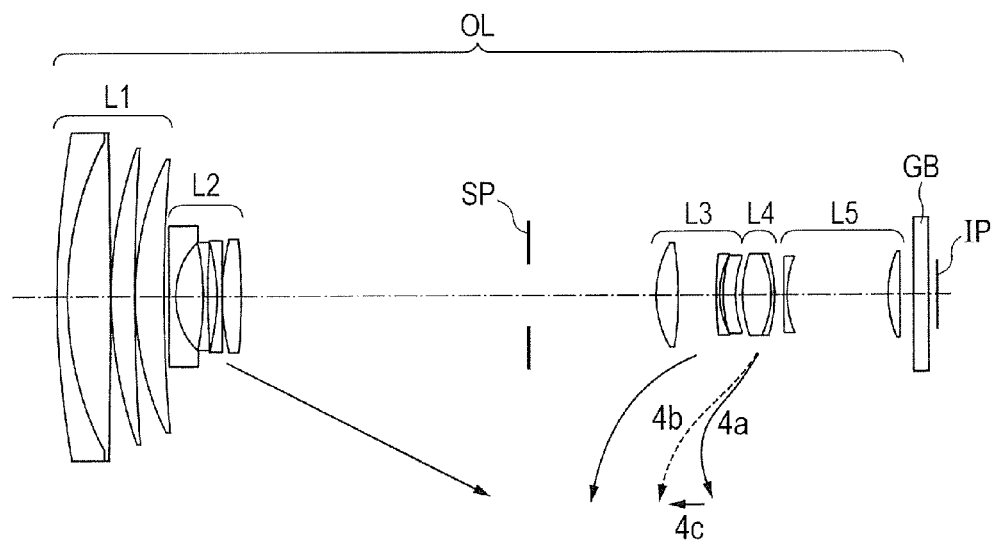
FIG. 9 is a lens cross-sectional view according to Embodiment 5 of the present invention.
Figure 10A:
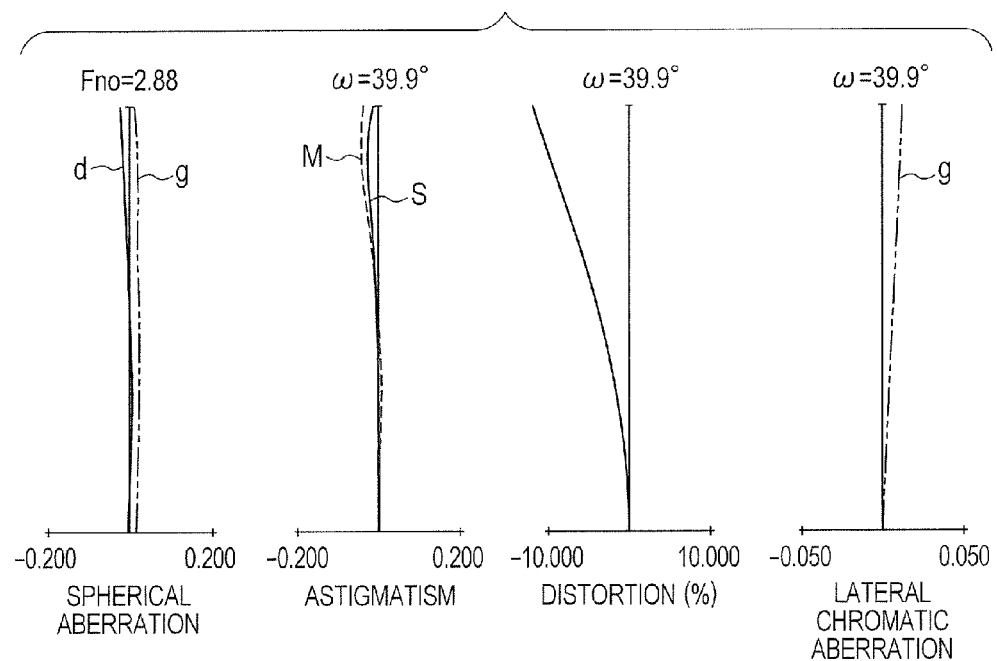
FIG. 10A is a diagram for showing aberrations at a wide angle end according to Embodiment 5.
Figure 10B:
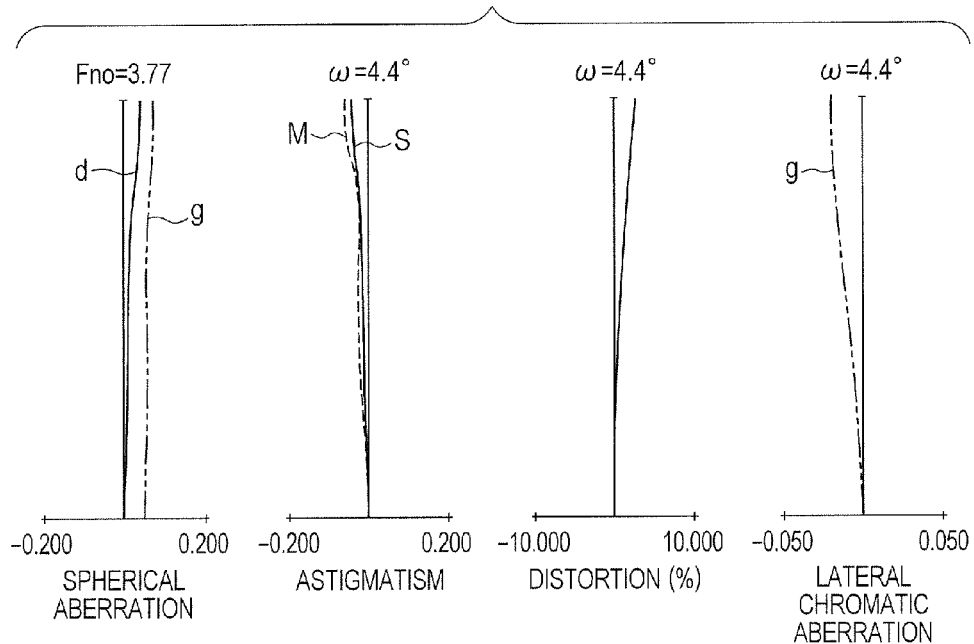
FIG. 10B is a diagram for showing aberrations at an intermediate zoom position according to Embodiment 5.
Figure 10C:
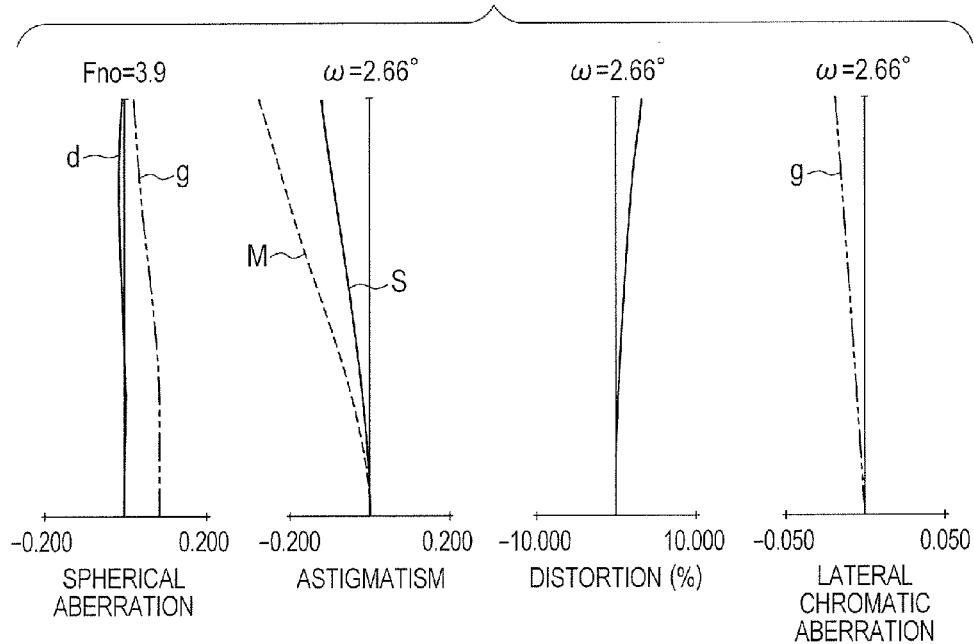
FIG. 10C is a diagram for showing aberrations at a telephoto end according to Embodiment 5.
Figure 11:
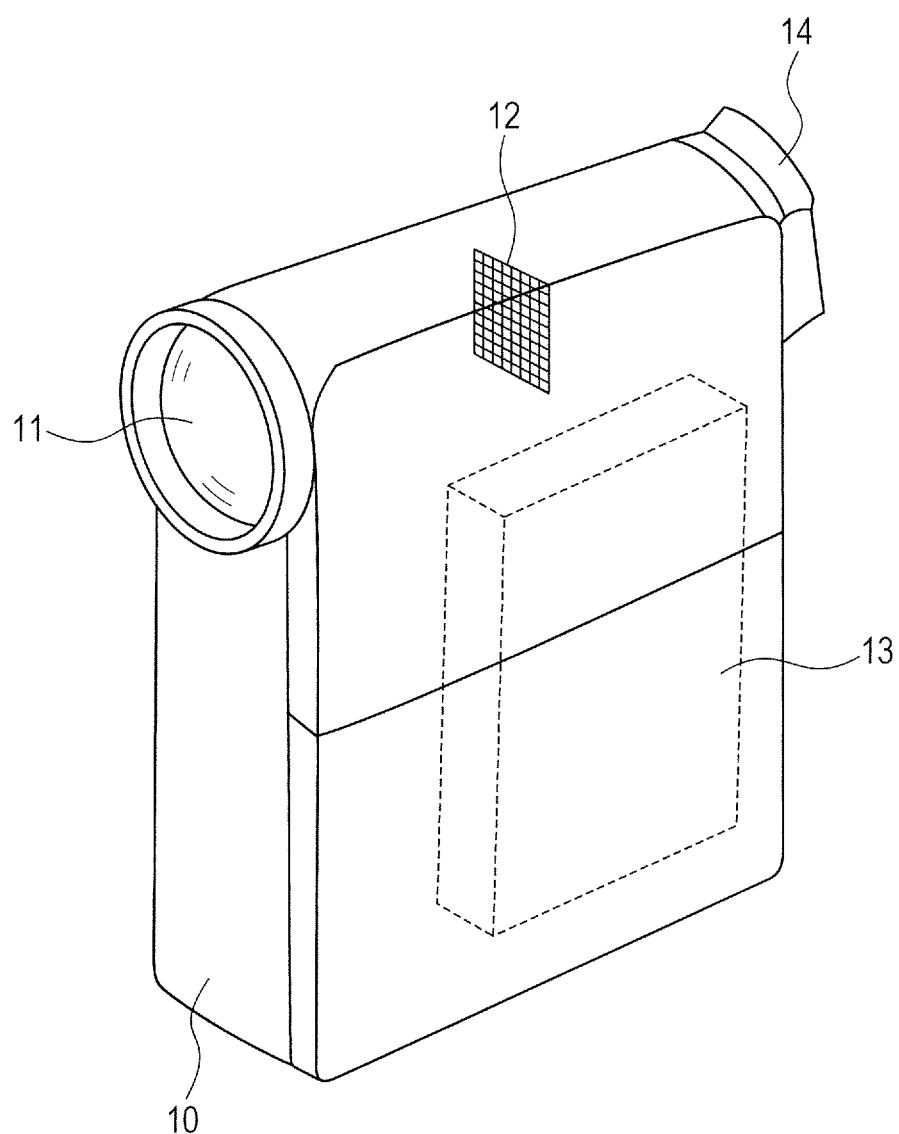
FIG. 11 is a schematic apparatus view of an optical instrument (video camera) including a photography lens according to the present invention.

FIG. 9 is a lens cross-sectional view of a zoom lens at a wide angle end (short focal length end) according to Embodiment 5 of the present invention. FIGS. 10A, 10B, and 10C are respectively aberration diagrams at the wide angle end, an intermediate zoom position, and a telephoto end of the zoom lens of Embodiment 5 of the present invention. The zoom lens of Embodiment 5 has a zoom ratio of 17.50 and an f-number of from 2.88 to 3.90. FIG. 11 is a schematic view of a main part of an image pickup apparatus according to the present invention.

The zoom lens according to each of Embodiment 1 to Embodiment 5 is an image pickup lens system for use with the image pickup apparatus. In the lens cross-sectional views, the left side is the object side, and the right side is the image side. In the lens cross-sectional views, a zoom lens OL includes a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive or negative refractive power. An aperture stop SP, which determines an f-number ray, is located between the second lens unit L2 and the third lens unit L3.

A glass optical block GB corresponds to an optical filter, a face plate, or the like. An image plane IP corresponds to an element surface of a solid-state image pickup element such as a CCD sensor and a CMOS sensor when the zoom lens is used as a photographing optical system of a digital still camera or a video camera, and corresponds to a film surface when the zoom lens is used as a photographing optical system of a silver-halide film camera. In spherical aberration diagrams, a d-line is represented by d, and a g-line is represented by g. In astigmatism diagrams, a meridional image plane and a sagittal image plane with respect to the d-line are respectively represented by M and S. In distortion, the d-line is shown. In lateral chromatic aberration, aberration of the g-line with respect to the d-line is represented by g. An f-number is represented by Fno and a half angle of view (degree) is represented by ω.

Note that, in each of the following Embodiments, the wide angle end and the telephoto end mean zoom positions when a variable magnification lens unit (second lens unit) is located at one end and the other end of a range in which the variable magnification lens unit is mechanically movable on an optical axis, respectively.

In each of Embodiments, during zooming from the wide angle end to the telephoto end, as indicated by the arrows, the second lens unit L2 is configured to move toward the image side, and the third lens unit is configured to move non-linearly toward a subject side to vary magnification. Moreover, the fourth lens unit L4 is configured to move along a locus that is convex toward the object side to correct an image plane variation accompanying the magnification varying.

Moreover, a rear focus type in which the fourth lens unit L4 is moved on the optical axis to perform focusing is adopted. A solid curve 4a and a dotted curve 4b regarding the fourth lens unit L4 are respectively movement loci for correcting an image plane variation accompanying zooming from the wide angle end to the telephoto end when focusing at the object at infinity and the object at the short distance. In this manner, the fourth lens unit L4 takes the loci that are convex toward the object side to effectively use a space between the third lens unit L3 and the fourth lens unit L4, which effectively attains a reduction in total lens length.

The term "total lens length" as used herein refers to a value obtained by adding air-converted back focus (BF) to a distance from the first lens surface to the last lens surface. Moreover, in a case where focusing from an object at infinity to an object at short distance is performed at the telephoto end, the focusing is performed by extending the fourth lens unit L4 to the front side (object side) as indicated by an arrow 4c. Note that, the first lens unit L1 is configured not to move in an optical axis direction for focusing, but may be moved as necessary for correcting aberrations.

Moreover, during image-blur correction, a lens subunit forming the whole or a part of the third lens unit L3 is configured to move so as to have a component in a direction perpendicular to an optical axis. This moves a captured image in the direction perpendicular to the optical axis to correct a blur of the captured image that occurs when the zoom lens is oscillated.

The zoom lens according to each of Embodiments defines each element so as to reduce an effective diameter of a front lens while having a wide angle of view. The zoom lens having the wide angle of view has a large angle of a beam that enters a front lens (first lens surface), and hence the distance from the front lens to the aperture stop SP is an important element in downsizing the entire zoom lens.

Therefore, in each of Embodiments, the third lens unit L3 is a lens unit that is movable for the zooming, and the third lens unit L3 is positioned closer to the image side at the wide angle end than at the telephoto end, which increases an interval between the second lens unit L2 and the third lens unit L3 at the wide angle end to realize the wide angle of view. This facilitates the increase in angle of view without excessively strengthening the negative power (negative refractive power) of the second lens unit L2.

Further, the third lens unit L3 is positioned closer to the object side at the telephoto end than at the wide angle end to appropriately share the magnification varying between the third lens unit L3 and the fourth lens unit L4, to thereby reduce a movement amount of the second lens unit L2 accompanying the zooming. As a result, an interval between the front lens and the aperture stop SP becomes the minimum required length for the magnification varying. Such lens configurations are adopted to appropriately set the negative power of the second lens unit L2 and the interval between the front lens and the aperture stop SP, to thereby suppress the increase in effective diameter of the front lens.

Moreover, the fifth lens unit L5 having a positive or negative refractive power is arranged between the fourth lens unit L4 and an image pickup element to satisfactorily correct a Petzval sum of an entire system of the zoom lens and an angle of incidence of a beam on an image plane, to thereby downsize the entire system. This facilitates the reduction in effective diameter of the front lens while maintaining a good optical characteristic over the entire zoom range.

The zoom lens according to the embodiments of the present invention satisfies the following conditional expressions, $$4.7 < f3/fw < 8.0 \quad (1)$$

$$1.2 < f3/f4 < 2.7 \quad (2)$$

$$1.2 < \beta 34t/\beta 34w < 3.0 \quad (3)$$

where fw denotes a focal length of an entire system of the zoom lens at the wide angle end, f3 denotes a focal length of the third lens unit L3, f4 denotes a focal length of the fourth lens unit L4, β34w denotes a lateral magnification of a lens group consisting of the third lens unit L3 and the fourth lens unit L4 at the wide angle end, and β34t denotes a lateral magnification of the lens group consisting of the third lens unit L3 and the fourth lens unit L4 at the telephoto end.

Next, the technical meanings of the above-mentioned conditional expressions are described. The conditional expression (1) is intended to appropriately set a ratio between the focal length of the third lens unit L3 and the focal length of the entire system at the wide angle end. When the ratio exceeds the upper limit of the conditional expression (1) and hence the positive power of the third lens unit L3 becomes too weak, a movement amount of the third lens unit L3 during the zooming for sharing the magnification varying becomes excessively large to increase the total lens length, and hence it is difficult to downsize the entire system. When the ratio falls below the lower limit of the conditional expression (1) and hence the positive power of the third lens unit L3 becomes too strong, spherical aberration and a curvature of field are increased at the wide angle end, and hence it is difficult to correct those various aberrations.

The conditional expression (2) is intended to appropriately set a ratio between the focal length of the third lens unit L3 and the focal length of the fourth lens unit L4. When the ratio exceeds the upper limit of the conditional expression (2) and hence the positive power of the third lens unit L3 becomes too weak compared to the positive power of the fourth lens unit L4, a movement amount of the third lens unit L3 during the zooming for sharing the magnification varying becomes excessively large. This increases the total lens length, and hence it is difficult to downsize the entire system. When the ratio falls below the lower limit of the conditional expression (2) and hence the positive power of the third lens unit L3 becomes too strong, spherical aberration and a curvature of field are increased at the wide angle end, and hence it is difficult to correct those various aberrations.

The conditional expression (3) is intended to appropriately set a ratio between lateral magnifications of a combined system obtained by combining the third lens unit L3 and the fourth lens unit L4 at the wide angle end and the telephoto end. This expression indicates a magnification varying ratio of the combined system obtained by combining the third lens unit L3 and the fourth lens unit L4 at the wide angle end and the telephoto end. When the ratio exceeds the upper limit of the conditional expression (3) and hence the partial responsibilities in varying magnification of the third lens unit L3 and the fourth lens unit L4 become excessively high, variations in curvature of field and coma are increased during the zooming from the wide angle end to the telephoto end, and hence it is difficult to correct those various aberrations.

When the ratio falls below the lower limit of the conditional expression (3), the partial responsibility in varying magnification of the second lens unit L2 becomes high, the movement amount of the second lens unit L2 accompanying the zooming is increased, and the total lens length is increased, and hence it is difficult to downsize the entire system. It is more preferred to set the numerical ranges of the conditional expressions (1), (2), and (3) as follows.

$$4.8 < f3/fw < 7.5 \quad (1a)$$

$$1.2 < f3/f4 < 2.5 \quad (2a)$$

$$1.4 < \beta 34t/\beta 34w < 2.5 \quad (3a)$$

It is more preferred to set the numerical ranges of the conditional expressions (1a), (2a), and (3a) as follows.

$$5.0 < f3/fw < 7.2 \quad (1b)$$

$$1.3 < f3/f4 < 2.4 \quad (2b)$$

$$1.6 < \beta 34t/\beta 34w < 2.2 \quad (3b)$$

In each of Embodiments, the above-mentioned configuration is adopted to obtain the zoom lens which is small in size as the entire system, in particular, is reduced in effective diameter of the front lens, and has a high optical characteristic over the entire zoom range while having the wide angle of view and a high zoom ratio.

In each of Embodiments, it is further preferred to satisfy at least one of the conditions provided below. It is preferred that the fifth lens unit L5 be configured not to move for the zooming. With this configuration, a device structure in the vicinity of the image pickup element when applied to the image pickup apparatus may be simplified, and hence it is easy to downsize the entire apparatus.

It is preferred that the first lens unit L1 include at least two positive lenses and at least one negative lens, and that the second lens unit L2 include at least one positive lens and at least two negative lenses. Moreover, it is preferred that the third lens unit L3 include at least one positive lens and at least one negative lens, and that at least one of lens surfaces of the positive lens included in the third lens unit L3 have an aspherical shape. The first lens unit L1 and the second lens unit L2 are configured as described above to facilitate correction of chromatic aberration in the lens units.

Axial chromatic aberration and lateral chromatic aberration are corrected in each of the lens units to reduce the variation in chromatic aberration during the zooming from the wide angle end to the telephoto end, and hence it is easy to obtain the high optical characteristic compatible with the increased number of pixels. Moreover, it is preferred that the third lens unit L3 include the positive lens and the negative lens to satisfactorily correct the chromatic aberration, and that the at least one lens surface of the positive lens have the aspherical shape. With this, it is easy to correct the spherical aberration and the curvature of field at the wide angle end.

Moreover, during the image-blur correction, it is preferred that the whole or a part of the third lens unit L3 be moved toward a direction having the component in the direction perpendicular to the optical axis. With this, it is easy to maintain the good optical characteristic during the image-blur correction. Moreover, in order for the entire system to have a small size, in particular, for the effective diameter of the front lens to be reduced, and to satisfactorily maintain an even higher optical characteristic over the entire zoom range while having the wide angle of view and the high zoom ratio, it is desired to satisfy at least one of the conditional expressions provided below:

$$0.3 < (\beta 2t/\beta 2w)/(ft/fw) < 0.7 \quad (4)$$

$$1.2 < f1/f3 < 2.4 \quad (5)$$

$$2.5 < f4/fw < 5.0 \quad (6)$$

$$0.2 < |m3|/f3 < 0.6 \quad (7)$$

$$-2.4 < f2/fw < -1.2 \quad (8)$$

$$-8.0 < f1/f2 < -4.0 \quad (9)$$

where β2w and β2t respectively denote lateral magnifications of the second lens unit L2 at the wide angle end and the telephoto end, ft denotes a focal length of the entire system at the telephoto end, f1 denotes a focal length of the first lens unit L1, f2 denotes a focal length of the second lens unit L2, and m3 denotes a movement amount of the third lens unit L3 during the zooming from the wide angle end to the telephoto end where the sign of the movement amount is negative when the third lens unit L3 is positioned closer to the object side by the zooming at the telephoto end than at the wide angle end, and is positive when the third lens unit L3 is positioned closer to the image side at the telephoto end than at the wide angle end.

Next, the technical meanings of the above-mentioned conditional expressions are described.

The conditional expression (4) is intended to appropriately set a relationship of a ratio between the lateral magnifications of the second lens unit L2 at the wide angle end and the telephoto end with respect to a ratio between the focal length of the entire system at the wide angle end and the focal length of the entire system at the telephoto end, that is, a zoom ratio. The conditional expression (4) is intended to reduce the effective diameter of the front lens while realizing the high zoom ratio.

When the ratio exceeds the upper limit of the conditional expression (4), the partial responsibility in varying magnification of the second lens unit L2 becomes too high, with the result that the interval between the front lens (first lens surface) and the aperture stop SP is excessively increased, the total lens length and the effective diameter of the front lens are increased, and the entire system is increased in size. When the ratio falls below the lower limit of the conditional expression (4), the partial responsibility in varying magnification of the second lens unit L2 becomes too low, and hence in order to obtain a desired zoom ratio, the partial responsibilities in varying magnification of the third lens unit L3 and the fourth lens unit L4 need to be increased. In other words, the powers of the third lens unit L3 and the fourth lens unit L4 need to be strengthened, and as a result, the spherical aberration and the curvature of field are increased, and hence it is difficult to correct those various aberrations.

The conditional expression (5) is intended to appropriately set a ratio of the focal length of the first lens unit L1 and the focal length of the third lens unit L3. The conditional expression (5) is intended to satisfactorily maintain the high optical characteristic over the entire zoom range while downsizing the entire system. When the ratio exceeds the upper limit of the conditional expression (5) and hence the focal length of the first lens unit L1 becomes too long, the total lens length and the effective diameter of the front lens are increased, and the entire system is increased in size. Moreover, the positive power of the third lens unit L3 becomes too strong, and the spherical aberration and the curvature of field are increased at the wide angle end, and hence it is difficult to correct those various aberrations.

When the ratio falls below the lower limit of the conditional expression (5) and hence the positive power of the first lens unit L1 becomes too strong, it becomes difficult to suppress the variations in various aberrations such as astigmatism, the coma, and the curvature of field over the entire zoom range.

The conditional expression (6) is intended to appropriately set a ratio between the focal length of the fourth lens unit L4 and the focal length of the entire system at the wide angle end. The conditional expression (6) is intended to reduce the effective diameter of the front lens while realizing the high zoom ratio. When the ratio exceeds the upper limit of the conditional expression (6) and hence the focal length of the fourth lens unit L4 becomes too long, movement amounts of the fourth lens unit L4 during the zooming and focusing become large, with the result that the total lens length and the effective diameter of the front lens are increased, which increases the size of the entire system. When the ratio falls below the lower limit of the conditional expression (6) and hence the positive power of the fourth lens unit L4 becomes too strong, it becomes difficult to suppress the variations in various aberrations such as astigmatism, the coma, and the curvature of field over the entire zoom range.

The conditional expression (7) is intended to appropriately set a ratio between the movement amount of the third lens unit L3 during the zooming and the focal length of the third lens unit L3. The conditional expression (7) is intended to obtain the high optical characteristic over the entire zoom range while realizing the wide angle of view and the high zoom ratio. The movement amount of the third lens unit L3 in the optical axis direction accompanying the zooming from the wide angle end to the telephoto end is represented by m3.

When the ratio exceeds the upper limit of the conditional expression (7) and hence the positive power of the third lens unit L3 becomes too strong with respect to the movement amount of the third lens unit L3 during the zooming, it becomes difficult to suppress the variation in curvature of field, which occurs in the third lens unit L3 accompanying the zooming from the wide angle end to the telephoto end. When the ratio falls below the lower limit of the conditional expression (7) and hence the movement amount of the third lens unit L3 during the zooming is reduced, the total lens length is reduced, but the partial responsibility in varying magnification of the second lens unit L2 is increased to increase the effective diameter of the front lens.

The conditional expression (8) is intended to appropriately set a ratio between the focal length of the second lens unit L2 and the focal length of the entire system at the wide angle end. The conditional expression (8) is intended to reduce the effective diameter of the front lens while realizing the high zoom ratio. When the ratio exceeds the upper limit of the conditional expression (8) and hence the negative power of the second lens unit L2 becomes too strong, the variation in curvature of field is increased during the zooming, and hence it is difficult to suppress the aberration. When the ratio falls below the lower limit of the conditional expression (8) and hence the negative power of the second lens unit L2 becomes weak, the movement amount during the zooming is increased, and the total lens length and the effective diameter of the front lens are increased, which increases the size of the entire system.

The conditional expression (9) is intended to appropriately set a ratio between the focal length of the first lens unit L1 and the focal length of the second lens unit L2. When the ratio exceeds the upper limit of the conditional expression (9) and hence the positive power of the first lens unit L1 becomes strong, it becomes difficult to suppress the variations in various aberrations such as the astigmatism, the coma, and the curvature of field over the entire zoom range. When the ratio falls below the lower limit of the conditional expression (9) and hence the focal length of the first lens unit L1 becomes too long, the total lens length and the effective diameter of the front lens are increased, which increases the size of the entire system. Moreover, the negative power of the second lens unit L2 becomes too strong, and a large curvature of field occurs during the zooming, and hence it is difficult to suppress the variation in aberration.

Note that, in each of Embodiments, for the purpose of correcting the aberrations, it is further preferred to set the numerical ranges of the conditional expressions (4) to (9) as follows.

$$0.40 < (\beta 2t/\beta 2w)/(ft/fw) < 0.65 \tag{4a}$$

$$1.3 < f1/f3 < 2.2 \tag{5a}$$

$$2.8 < f4/fw < 4.5 \tag{6a}$$

$$0.25 < |L3st|/f3 < 0.50 \tag{7a}$$

$$-2.0 < f2/fw < -1.3 \tag{8a}$$

$$-7.0 < f1/f2 < -5.0 \tag{9a}$$

It is still further preferred to set the numerical ranges of the conditional expressions (4a) to (9a) as follows.

$$0.45 < (\beta 2t/\beta 2w)/(ft/fw) < 0.60 \tag{4b}$$

$$1.4 < f1/f3 < 2.0 \tag{5b}$$

$$3.0 < f4/fw < 4.0 \tag{6b}$$

$$0.3 < |L3st|/f3 < 0.4 \tag{7b}$$

$$-1.8 < f2/fw < -1.4 \tag{8b}$$

$$-6.0 < f1/f2 < -5.5 \tag{9b}$$

In each of Embodiments, each of the lens units is configured as described above to reduce the size of the entire system, in particular, to reduce the effective diameter of the front lens, and to obtain the high optical characteristic over the entire zoom range while having the wide angle of view and the high zoom ratio.

Next, an embodiment of a video camera in which the zoom lens according to the present invention is used as a photographing optical system is described with reference to FIG. 11. In FIG. 11, the video camera includes a camera main body 10 and a photographing optical system 11 including the zoom lens described in any one of Embodiments 1 to 5. A solid-state image pickup element (photoelectric transducer) 12, such as a CCD sensor or a CMOS sensor, is included in the camera main body to receive a subject image formed by the photographing optical system 11.

A recording unit 13 records a subject image received by the solid-state image pickup element 12. A viewfinder 14 is formed of a liquid crystal display panel or the like, and is used to observe the subject image formed on the solid-state image pickup element 12. Note that, the zoom lens according to each of Embodiments may be used as a projection optical system for a projection device (projector).

It is preferred that the image pickup apparatus of the present invention include any one of the above-mentioned zoom lenses and a circuit configured to electrically correct the distortion and/or the lateral chromatic aberration. If the zoom lens is constructed to have a lens structure which can permit the distortion in such a manner, it becomes easy to reduce the number of lenses of the zoom lens and the size of the zoom lens. In addition, by electrically correcting the lateral chromatic aberration, the color bleeding of the photographed image is reduced and the resolving power is easily enhanced.

Next, Numerical Embodiments 1 to 5 are described, which respectively correspond to Embodiments 1 to 5 of the present invention. In each of Numerical Embodiments 1 to 5, symbol i represents the order of a surface from an object side. Symbol ri represents a radius of curvature of an i-th surface in order from the object side, symbol di represents a lens thickness and an air gap between an i-th surface and an (i+1)th surface in order from the object side, and symbols ndi and vdi represent a refractive index and an Abbe constant of a material of an optical member between the i-th surface and the (i+1)th surface in order from the object side, respectively. In addition, two surfaces closest to the image side are made of a glass material such as a face plate. An aspherical shape is expressed by the expression below.

$$X = \frac{\frac{H^2}{R}}{1 + \sqrt{1 - (1+K)\left(\frac{H}{R}\right)^2}} + A4H^4 + A6H^6 + A8H^8 + A10H^{10}$$

where the X axis corresponds to the optical axis direction, the H axis corresponds to the direction perpendicular to the optical axis, the light propagation direction is positive, symbol R represents a paraxial curvature radius, symbol K represents a conic constant, and symbols A4, A6, A8, A10, and A12 represent aspherical coefficients, respectively.

In addition, * means a surface having an aspherical shape, and [e-x] means $10^{-x}$. Symbol BF is back focus, which is represented by an air-converted length from a last lens surface to an image plane. In Table 1, the calculation results of the conditional expressions of Numerical Embodiments are shown.

Numerical Embodiment 1

Unit mm

Surface data

| Surface number | r | d | nd | vd |
|---|---|---|---|---|
| 1 | 211.055 | 2.50 | 1.80610 | 33.3 |
| 2 | 72.313 | 10.52 | 1.49700 | 81.5 |
| 3 | −2,679.330 | 0.17 | | |
| 4 | 89.122 | 5.86 | 1.49700 | 81.5 |
| 5 | 449.444 | 0.17 | | |
| 6 | 67.656 | 6.68 | 1.59522 | 67.7 |
| 7 | 356.100 | (Variable) | | |
| 8 | −2,219.128 | 1.60 | 1.83481 | 42.7 |
| 9 | 19.484 | 6.37 | | |
| 10 | −76.813 | 1.00 | 1.77250 | 49.6 |
| 11 | 41.036 | 1.53 | | |
| 12 | 33.696 | 2.92 | 1.95906 | 17.5 |
| 13 | 232.204 | 1.90 | | |
| 14 | −49.384 | 1.00 | 1.59522 | 67.7 |
| 15 | 386.409 | (Variable) | | |
| 16 (Stop) | ∞ | (Variable) | | |
| 17* | 20.286 | 6.72 | 1.55332 | 71.7 |
| 18* | −77.959 | 6.76 | | |
| 19 | 55.195 | 0.80 | 1.80610 | 33.3 |
| 20 | 18.092 | 2.19 | | |
| 21 | 105.348 | 3.00 | 1.49700 | 81.5 |
| 22 | −2,334.343 | (Variable) | | |
| 23* | 24.900 | 6.87 | 1.55332 | 71.7 |
| 24 | −22.828 | 0.80 | 1.80610 | 33.3 |
| 25 | −40.092 | (Variable) | | |
| 26 | 3,362.929 | 0.80 | 1.49700 | 81.5 |
| 27 | 19.798 | 23.65 | | |
| 28 | 22.187 | 3.31 | 1.49700 | 81.5 |
| 29 | −900.767 | 3.00 | | |
| 30 | ∞ | 3.50 | 1.51633 | 64.1 |
| 31 | ∞ | 2.02 | | |
| Image plane | ∞ | | | |

Aspherical surface data

Seventeenth surface

K = −4.41539e+000  A4 = 5.28563e−005  A6 = −1.89109e−007
A8 = 7.14574e−010  A10 = −2.37488e−012  A12 = 2.02031e−015

Eighteenth surface

K = 0.00000e+000  A4 = 4.16282e−006  A6 = 1.03936e−008
A8 = −1.64141e−010

Twenty-third surface

K = 3.91772e−001  A4 = −8.64529e−006  A6 = −1.96615e−008
A8 = 7.94665e−011  A10 = −3.34431e−013

Various data
Zoom ratio 17.50

| | Wide angle | Intermediate | Telephoto |
|---|---|---|---|
| Focal length | 9.76 | 104.00 | 170.79 |
| F-number | 2.88 | 3.77 | 3.90 |
| Half angle of view (degree) | 36.48 | 4.51 | 2.75 |
| Image height | 7.22 | 8.20 | 8.20 |
| Total lens length | 196.17 | 196.17 | 196.17 |
| BF | 7.33 | 7.33 | 7.33 |
| d7 | 1.34 | 49.20 | 56.36 |
| d15 | 57.96 | 10.10 | 2.95 |
| d16 | 28.98 | 6.18 | 6.98 |
| d22 | 1.45 | 9.25 | 12.58 |
| d25 | 2.00 | 17.00 | 12.87 |

Zoom lens unit data

| Unit | First surface | Focal length |
|---|---|---|
| 1 | 1 | 88.63 |
| 2 | 8 | −14.79 |
| 3 | 16 | ∞ |
| 4 | 17 | 56.40 |
| 5 | 23 | 33.05 |
| 6 | 26 | 86.75 |

Numerical Embodiment 2

Unit mm

Surface data

| Surface number | r | d | nd | vd |
|---|---|---|---|---|
| 1 | 248.370 | 2.50 | 1.80610 | 33.3 |
| 2 | 77.675 | 10.28 | 1.49700 | 81.5 |
| 3 | −698.008 | 0.17 | | |
| 4 | 91.618 | 6.01 | 1.49700 | 81.5 |
| 5 | 537.755 | 0.17 | | |

-continued

| Unit mm | | | | |
|---|---|---|---|---|
| 6 | 67.910 | 6.71 | 1.59522 | 67.7 |
| 7 | 334.797 | (Variable) | | |
| 8 | 289.890 | 1.60 | 1.95375 | 32.3 |
| 9 | 21.335 | 6.84 | | |
| 10 | −49.095 | 1.00 | 1.76385 | 48.5 |
| 11 | 60.883 | 0.30 | | |
| 12 | 37.288 | 3.58 | 1.95906 | 17.5 |
| 13 | −194.245 | 2.22 | | |
| 14 | −31.321 | 1.00 | 1.49700 | 81.5 |
| 15 | 92.054 | (Variable) | | |
| 16 (Stop) | ∞ | (Variable) | | |
| 17* | 20.928 | 6.64 | 1.55332 | 71.7 |
| 18* | −104.991 | 7.51 | | |
| 19 | 54.978 | 0.80 | 1.80610 | 33.3 |
| 20 | 18.179 | 3.50 | | |
| 21 | 37.606 | 3.00 | 1.49700 | 81.5 |
| 22 | 155.488 | (Variable) | | |
| 23* | 25.680 | 6.27 | 1.55332 | 71.7 |
| 24 | −30.406 | 0.80 | 1.80610 | 33.3 |
| 25 | −58.389 | (Variable) | | |
| 26 | 249.113 | 0.80 | 1.49700 | 81.5 |
| 27 | 20.120 | 24.19 | | |
| 28 | 19.958 | 3.22 | 1.49700 | 81.5 |
| 29 | 147.512 | 3.00 | | |
| 30 | ∞ | 3.50 | 1.51633 | 64.1 |
| 31 | ∞ | 2.02 | | |
| Image plane | ∞ | | | |

Aspherical surface data

Seventeenth surface

K = −4.44096e+000   A4 = 4.94109e−005   A6 = −1.63714e−007
A8 = 5.59290e−010   A10 = −1.33990e−012   A12 = 1.01262e−016

Eighteenth surface

K = 0.00000e+000   A4 = 2.45721e−006   A6 = 7.67870e−009
A8 = −9.71622e−011

Twenty-third surface

K = 3.92497e−001   A4 = −6.72710e−006   A6 = −9.73779e−009
A8 = 1.29738e−011   A10 = −6.26947e−014

Various data
Zoom ratio 17.50

| | Wide angle | Intermediate | Telephoto |
|---|---|---|---|
| Focal length | 9.76 | 100.07 | 170.79 |
| F-number | 2.88 | 3.77 | 3.90 |
| Half angle of view (degree) | 36.48 | 4.68 | 2.75 |
| Image height | 7.22 | 8.20 | 8.20 |
| Total lens length | 199.70 | 199.70 | 199.70 |
| BF | 7.33 | 7.33 | 7.33 |
| d7 | 0.84 | 47.97 | 55.01 |
| d15 | 57.87 | 10.75 | 3.70 |
| d16 | 31.05 | 10.58 | 10.37 |
| d22 | 1.49 | 7.77 | 11.94 |
| d25 | 2.00 | 16.19 | 12.23 |

Zoom lens unit data

| Unit | First surface | Focal length |
|---|---|---|
| 1 | 1 | 87.34 |
| 2 | 8 | −14.63 |
| 3 | 16 | ∞ |
| 4 | 17 | 53.83 |
| 5 | 23 | 37.77 |
| 6 | 26 | 92.95 |

Numerical Embodiment 3

| Unit mm | | | | |
|---|---|---|---|---|

Surface data

| Surface number | r | d | nd | vd |
|---|---|---|---|---|
| 1 | 231.015 | 2.50 | 1.80610 | 33.3 |
| 2 | 82.674 | 10.01 | 1.49700 | 81.5 |
| 3 | −1,180.111 | 0.17 | | |
| 4 | 91.547 | 6.24 | 1.49700 | 81.5 |
| 5 | 452.690 | 0.17 | | |
| 6 | 73.231 | 6.35 | 1.59522 | 67.7 |
| 7 | 289.334 | (Variable) | | |
| 8 | −552.711 | 1.60 | 1.95375 | 32.3 |
| 9 | 21.189 | 5.26 | | |
| 10 | −95.126 | 1.00 | 1.76385 | 48.5 |
| 11 | 52.460 | 3.91 | | |
| 12 | −32.874 | 1.00 | 1.49700 | 81.5 |
| 13 | 2,392.135 | 0.20 | | |
| 14 | 74.524 | 4.18 | 1.95906 | 17.5 |
| 15 | −100.514 | (Variable) | | |
| 16 (Stop) | ∞ | (Variable) | | |
| 17* | 20.867 | 5.02 | 1.55332 | 71.7 |
| 18* | −138.638 | 9.38 | | |
| 19 | 50.486 | 0.80 | 1.80610 | 33.3 |
| 20 | 17.488 | 1.31 | | |
| 21 | 36.921 | 3.00 | 1.49700 | 81.5 |
| 22 | 154.038 | (Variable) | | |
| 23* | 24.037 | 5.98 | 1.55332 | 71.7 |
| 24 | −26.572 | 0.80 | 1.80610 | 33.3 |
| 25 | −59.152 | (Variable) | | |
| 26 | 311.486 | 0.80 | 1.49700 | 81.5 |
| 27 | 20.348 | 23.05 | | |
| 28 | 19.996 | 3.25 | 1.49700 | 81.5 |
| 29 | 206.800 | 3.00 | | |
| 30 | ∞ | 3.50 | 1.51633 | 64.1 |
| 31 | ∞ | 2.02 | | |
| Image plane | ∞ | | | |

Aspherical surface data

Seventeenth surface

K = −4.46017e+000   A4 = 5.13497e−005   A6 = −1.68389e−007
A8 = 5.52911e−010   A10 = −1.17587e−012   A12 = −2.85290e−016

Eighteenth surface

K = 0.00000e+000   A4 = 2.47543e−006   A6 = 1.49942e−009
A8 = −6.53645e−011

Twenty-third surface

K = 4.69311e−001   A4 = −6.13676e−006   A6 = −2.14875e−008
A8 = 1.96057e−010   A10 = −9.58646e−013

Various data
Zoom ratio 17.50

| | Wide angle | Intermediate | Telephoto |
|---|---|---|---|
| Focal length | 9.76 | 100.60 | 170.79 |
| F-number | 2.88 | 3.77 | 3.90 |
| Half angle of view (degree) | 36.48 | 4.66 | 2.75 |
| Image height | 7.22 | 8.20 | 8.20 |
| Total lens length | 199.03 | 199.03 | 199.03 |
| BF | 7.33 | 7.33 | 7.33 |
| d7 | 1.54 | 54.49 | 62.40 |
| d15 | 65.50 | 12.56 | 4.65 |
| d16 | 25.17 | 5.39 | 5.26 |
| d22 | 1.52 | 8.14 | 12.32 |
| d25 | 2.00 | 15.17 | 11.11 |

-continued

Unit mm

Zoom lens unit data

| Unit | First surface | Focal length |
|---|---|---|
| 1 | 1 | 94.91 |
| 2 | 8 | −16.45 |
| 3 | 16 | ∞ |
| 4 | 17 | 54.91 |
| 5 | 23 | 37.48 |
| 6 | 26 | 86.89 |

Numerical Embodiment 4

Unit mm

Surface data

| Surface number | r | d | nd | vd |
|---|---|---|---|---|
| 1 | 212.700 | 2.50 | 1.80610 | 33.3 |
| 2 | 78.174 | 10.38 | 1.49700 | 81.5 |
| 3 | −1,399.220 | 0.17 | | |
| 4 | 91.967 | 5.88 | 1.49700 | 81.5 |
| 5 | 389.034 | 0.17 | | |
| 6 | 69.802 | 6.75 | 1.59522 | 67.7 |
| 7 | 314.192 | (Variable) | | |
| 8 | −476.544 | 1.60 | 1.95375 | 32.3 |
| 9 | 21.088 | 5.00 | | |
| 10 | −111.384 | 1.00 | 1.76385 | 48.5 |
| 11 | 44.791 | 3.95 | | |
| 12 | −33.633 | 1.00 | 1.49700 | 81.5 |
| 13 | 1,428.312 | 0.20 | | |
| 14 | 67.472 | 4.14 | 1.95906 | 17.5 |
| 15 | −110.897 | (Variable) | | |
| 16 (Stop) | ∞ | (Variable) | | |
| 17* | 19.520 | 4.80 | 1.55332 | 71.7 |
| 18* | −147.905 | 8.83 | | |
| 19 | 46.219 | 0.80 | 1.80610 | 33.3 |
| 20 | 16.255 | 1.23 | | |
| 21 | 32.953 | 3.00 | 1.49700 | 81.5 |
| 22 | 249.227 | (Variable) | | |
| 23* | 22.434 | 5.78 | 1.55332 | 71.7 |
| 24 | −26.445 | 0.80 | 1.80610 | 33.3 |
| 25 | −65.356 | (Variable) | | |
| 26 | 390.954 | 0.80 | 1.49700 | 81.5 |
| 27 | 18.413 | 20.20 | | |
| 28 | 20.756 | 3.21 | 1.49700 | 81.5 |
| 29 | 629.234 | 3.00 | | |
| 30 | ∞ | 3.50 | 1.51633 | 64.1 |
| 31 | ∞ | 2.02 | | |
| Image plane | ∞ | | | |

Aspherical surface data

Seventeenth surface

K = −4.38420e+000  A4 = 6.16203e−005  A6 = −2.25115e−007
A8 = 7.60650e−010  A10 = −1.43164e−012  A12 = −3.13532e−015

Eighteenth surface

K = 0.00000e+000  A4 = 2.58858e−006  A6 = −2.46758e−010
A8 = −1.24511e−010

Twenty-third surface

K = 5.22433e−001  A4 = −6.55339e−006  A6 = −1.37813e−008
A8 = −1.87726e−011  A10 = 6.40050e−013

-continued

Unit mm

Various data
Zoom ratio 17.50

| | Wide angle | Intermediate | Telephoto |
|---|---|---|---|
| Focal length | 9.76 | 99.95 | 170.79 |
| F-number | 2.88 | 3.77 | 3.90 |
| Half angle of view (degree) | 36.48 | 4.69 | 2.75 |
| Image height | 7.22 | 8.20 | 8.20 |
| Total lens length | 188.01 | 188.01 | 188.01 |
| BF | 7.33 | 7.33 | 7.33 |
| d7 | 1.53 | 52.56 | 60.18 |
| d15 | 61.49 | 10.46 | 2.83 |
| d16 | 21.95 | 5.09 | 4.75 |
| d22 | 1.53 | 7.06 | 11.86 |
| d25 | 2.00 | 13.33 | 8.87 |

Zoom lens unit data

| Unit | First surface | Focal length |
|---|---|---|
| 1 | 1 | 91.72 |
| 2 | 8 | −16.17 |
| 3 | 16 | ∞ |
| 4 | 17 | 49.29 |
| 5 | 23 | 36.90 |
| 6 | 26 | 105.51 |

Numerical Embodiment 5

Unit mm

Surface data

| Surface number | r | d | nd | vd |
|---|---|---|---|---|
| 1 | 225.062 | 2.50 | 1.80610 | 33.3 |
| 2 | 83.314 | 9.84 | 1.49700 | 81.5 |
| 3 | −1,696.509 | 0.17 | | |
| 4 | 100.848 | 5.60 | 1.49700 | 81.5 |
| 5 | 444.140 | 0.17 | | |
| 6 | 74.037 | 6.64 | 1.59522 | 67.7 |
| 7 | 331.537 | (Variable) | | |
| 8 | −2,641.809 | 1.60 | 1.95375 | 32.3 |
| 9 | 18.391 | 6.78 | | |
| 10 | −52.009 | 1.00 | 1.76385 | 48.5 |
| 11 | 256.413 | 2.25 | | |
| 12 | −42.250 | 1.00 | 1.49700 | 81.5 |
| 13 | 361.017 | 0.19 | | |
| 14 | 59.047 | 4.32 | 1.95906 | 17.5 |
| 15 | −146.662 | (Variable) | | |
| 16 (Stop) | ∞ | (Variable) | | |
| 17* | 22.118 | 5.32 | 1.55332 | 71.7 |
| 18* | −65.869 | 8.87 | | |
| 19 | 95.356 | 0.80 | 1.80610 | 33.3 |
| 20 | 20.322 | 0.70 | | |
| 21 | 28.952 | 2.99 | 1.49700 | 81.5 |
| 22 | 28.227 | (Variable) | | |
| 23* | 25.385 | 6.90 | 1.55332 | 71.7 |
| 24 | −18.924 | 0.80 | 1.80610 | 33.3 |
| 25 | −32.250 | (Variable) | | |
| 26 | 178.621 | 0.80 | 1.49700 | 81.5 |
| 27 | 21.462 | 23.67 | | |
| 28 | 23.998 | 2.98 | 1.49700 | 81.5 |
| 29 | −2,350.171 | 2.99 | | |
| 30 | ∞ | 3.50 | 1.51633 | 64.1 |
| 31 | ∞ | 2.02 | | |
| Image plane | ∞ | | | |

-continued

Unit mm

Aspherical surface data

Seventeenth surface

| | | |
|---|---|---|
| K = −5.92513e+000 | A4 = 5.82057e−005 | A6 = −2.58588e−007 |
| A8 = 1.27662e−009 | A10 = −4.63061e−012 | A12 = 7.89558e−015 |

Eighteenth surface

| | | |
|---|---|---|
| K = 0.00000e+000 | A4 = 5.44832e−006 | A6 = 6.45439e−009 |
| A8 = −4.15673e−011 | | |

Twenty-third surface

| | | |
|---|---|---|
| K = 6.51718e−001 | A4 = −1.43082e−005 | A6 = −2.07931e−008 |
| A8 = 7.14543e−011 | A10 = −2.32376e−013 | |

Various data
Zoom ratio 17.50

| | Wide angle | Intermediate | Telephoto |
|---|---|---|---|
| Focal length | 9.76 | 103.58 | 170.80 |
| F-number | 2.88 | 3.77 | 3.90 |
| Half angle of view (degree) | 36.48 | 4.53 | 2.75 |
| Image height | 7.22 | 8.20 | 8.20 |
| Total lens length | 205.77 | 205.77 | 205.77 |
| BF | 7.33 | 7.33 | 7.33 |
| d7 | 1.29 | 57.68 | 66.11 |
| d15 | 67.56 | 11.17 | 2.75 |
| d16 | 30.21 | 6.08 | 9.20 |
| d22 | 1.50 | 11.28 | 14.39 |
| d25 | 2.00 | 16.34 | 10.12 |

Zoom lens unit data

| Unit | First surface | Focal length |
|---|---|---|
| 1 | 1 | 98.24 |
| 2 | 8 | −17.13 |
| 3 | 16 | ∞ |
| 4 | 17 | 69.12 |
| 5 | 23 | 31.06 |
| 6 | 26 | 94.16 |

A relationship between each of the conditional expressions described above and various numerical values in Numerical Embodiments is shown in Table 1.

TABLE 1

| Conditional Expression | Numerical Embodiment | | | | |
|---|---|---|---|---|---|
| | 1 | 2 | 3 | 4 | 5 |
| (1) | 5.627 | 5.779 | 5.516 | 5.051 | 7.083 |
| (2) | 1.465 | 1.706 | 1.425 | 1.336 | 2.226 |
| (3) | 2.001 | 2.100 | 2.025 | 1.889 | 1.754 |
| (4) | 0.500 | 0.476 | 0.494 | 0.529 | 0.570 |
| (5) | 1.728 | 1.571 | 1.623 | 1.861 | 1.421 |
| (6) | 3.841 | 3.387 | 3.871 | 3.782 | 3.182 |
| (7) | 0.363 | 0.390 | 0.384 | 0.349 | 0.304 |
| (8) | −1.686 | −1.515 | −1.499 | −1.657 | −1.755 |
| (9) | −5.770 | −5.994 | −5.970 | −5.674 | −5.737 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-237549, filed Nov. 25, 2014, which is hereby incorporated by reference herein in its entirety.

What is claimed is:

1. A zoom lens, comprising, in order from an object side to an image side:
   a first lens unit having a positive refractive power;
   a second lens unit having a negative refractive power;
   an aperture stop;
   a third lens unit having a positive refractive power;
   a fourth lens unit having a positive refractive power; and
   a fifth lens unit having one of a positive refractive power and a negative refractive power,
   wherein the first lens unit is configured not to move for zooming, and the second lens unit, the third lens unit, and the fourth lens unit are configured to move during zooming to change intervals between adjacent lens units,
   wherein the second lens unit is positioned closer to the image side and the third lens unit is positioned closer to the object side at a telephoto end than at a wide angle end, and
   wherein the following conditional expressions are satisfied:

$$4.7 < f3/fw < 8.0;$$

$$1.2 < f3/f4 < 2.7;$$

and $$1.2 < \beta 34t/\beta 34w < 3.0,$$

where fw represents a focal length of an entire system of the zoom lens at the wide angle end, f3 represents a focal length of the third lens unit, f4 represents a focal length of the fourth lens unit, β34w represents a lateral magnification of a lens group consisting of the third lens unit and the fourth lens unit at the wide angle end, and β34t represents a lateral magnification of the lens group consisting of the third lens unit and the fourth lens unit at the telephoto end.

2. A zoom lens according to claim 1, wherein the fifth lens unit is configured not to move for the zooming.

3. A zoom lens according to claim 1,
   wherein the first lens unit comprises at least two positive lenses and a negative lens,
   wherein the second lens unit comprises a positive lens and at least two negative lenses, and
   wherein the third lens unit comprises a positive lens and a negative lens, and at least one of lens surfaces of the positive lens included in the third lens unit has an aspherical shape.

4. A zoom lens according to claim 1, wherein the following conditional expression is satisfied:

$$0.3 < (\beta 2t/\beta 2w)/(ft/fw) < 0.7,$$

where β2w and β2t respectively represent lateral magnifications of the second lens unit at the wide angle end and the telephoto end and ft represents a focal length of the entire system at the telephoto end.

5. A zoom lens according to claim 1, wherein the following conditional expression is satisfied:

$$1.2 < f1/f3 < 2.4,$$

where f1 represents a focal length of the first lens unit.

6. A zoom lens according to claim 1, wherein the following conditional expression is satisfied:

$$2.5 < f4/fw < 5.0.$$

7. A zoom lens according to claim 1, wherein the following conditional expression is satisfied:

$$0.2 < |m3|/f3 < 0.6,$$

where m3 represents a movement amount of the third lens unit during zooming from the wide angle end to the telephoto end.

8. A zoom lens according to claim 1, wherein the following conditional expressions are satisfied:

$-2.4 < f2/fw < -1.2;$ and $-8.0 < f1/f2 < -4.0,$ where f1 represents a focal length of the first lens unit, and f2 represents a focal length of the second lens unit.

9. A zoom lens according to claim 1, wherein, during image-blur correction, a whole or a part of the third lens unit is configured to move toward a direction having a component in a direction perpendicular to an optical axis.

10. An image pickup apparatus, comprising:
a zoom lens comprising, in order from an object side to an image side:
   a first lens unit having a positive refractive power;
   a second lens unit having a negative refractive power;
   an aperture stop;
   a third lens unit having a positive refractive power;
   a fourth lens unit having a positive refractive power; and
   a fifth lens unit having one of a positive refractive power and a negative refractive power,
wherein the first lens unit is configured not to move for zooming, and the second lens unit, the third lens unit, and the fourth lens unit are configured to move during zooming to change intervals between adjacent lens units,
wherein the second lens unit is positioned closer to the image side and the third lens unit is positioned closer to the object side at a telephoto end than at a wide angle end, and
wherein the following conditional expressions are satisfied:

$4.7 < f3/fw < 8.0;$ $1.2 < f3/f4 < 2.7;$ and $1.2 < \beta34t/\beta34w < 3.0,$ where fw represents a focal length of an entire system of the zoom lens at the wide angle end, f3 represents a focal length of the third lens unit, f4 represents a focal length of the fourth lens unit, $\beta34w$ represents a lateral magnification of a lens group consisting of the third lens unit and the fourth lens unit at the wide angle end, and $\beta34t$ represents a lateral magnification of the lens group consisting of the third lens unit and the fourth lens unit at the telephoto end; and
   an image pickup element configured to receive light of an image formed by the zoom lens.

* * * * *